July 22, 1952 R. J. BARBER 2,604,420
APPARATUS FOR THE MANUFACTURE OF PNEUMATIC TIRES
Filed Nov. 10, 1950 4 Sheets-Sheet 1

Ronald Jesse Barber Inventor

By Benj. T. Rauber Attorney

July 22, 1952 R. J. BARBER 2,604,420
APPARATUS FOR THE MANUFACTURE OF PNEUMATIC TIRES
Filed Nov. 10, 1950 4 Sheets-Sheet 2

Inventor
Ronald Jesse Barber
By Benj. T. Rauber Attorney

July 22, 1952  R. J. BARBER  2,604,420
APPARATUS FOR THE MANUFACTURE OF PNEUMATIC TIRES
Filed Nov. 10, 1950  4 Sheets-Sheet 3

Ronald Jesse Barber, Inventor

By Benj. T. Barber, Attorney

July 22, 1952  R. J. BARBER  2,604,420
APPARATUS FOR THE MANUFACTURE OF PNEUMATIC TIRES
Filed Nov. 10, 1950  4 Sheets-Sheet 4

Ronald Jesse Barber, Inventor

By Benj. T. Rauber, Attorney

Patented July 22, 1952

2,604,420

UNITED STATES PATENT OFFICE 2,604,420

APPARATUS FOR THE MANUFACTURE OF PNEUMATIC TIRES

Ronald Jesse Barber, Erdington, Birmingham, England, assignor to Dunlop Tire and Rubber Corporation, Buffalo, N. Y., a corporation of New York Application November 10, 1950, Serial No. 194,959
In Great Britain September 13, 1949

8 Claims. (Cl. 154—9)

This invention relates to apparatus for the manufacture of pneumatic tires, and more particularly is concerned with improved means for laying down tire building materials, such as the tread and sidewalls, during the building operation.

In one well known method of tire manufacture, the tire carcass is built up on a flat building drum from a number of plies of tire fabric. A composite, extruded section of rubber compound made up of three parts which form the tread and sidewalls is then applied centrally to the outer periphery of the tire carcass. The tread, shoulders and sidewalls are then pressed by hand pressure into firm contact with the tire carcass to cause them to adhere thereto. This will be referred to hereinafter in the specification as laying down and is necessary so that the following consolidating operation, which is more severe and in which revolving metal discs are traversed from the centre outwards across the tread and sidewalls, will not cause the latter materials to spread axially.

My present invention provides improved apparatus for laying down tire building materials which apparatus is power driven and more thorough in operation than the manual method previously mentioned. In addition the apparatus is one which provides a consistent laying down treatment in which successive articles are similarly treated, thus substantially eliminating variations in the amount and extent of laying down which are inherent in the manual method, and resulting in improved uniformity of product.

According to the invention, apparatus for laying down tire building materials which have been applied to a tire carcass mounted on a rotatable forming drum prior to the consolidating operation comprises a pair of freely rotatable circular resilient elements adapted to contact the tire building materials and to be rotated thereby and means for moving the elements axially apart during said rotation.

In a preferred form of the invention a pair of carriages are mounted in mutually adjacent relationship on a traversing shaft. Each carriage carries an element comprising a tread roller in the form of an annular pneumatic tube on a supporting wheel and a disc, the disc being disposed between the elements. The carriages are movable towards the materials mounted on the drum so that the elements comprising the tread rollers and discs contact the materials, the carriages also being traversable from the mutually adjacent position whereby the elements move axially outwardly in contact with the surface of the materials on the drum. Means are also provided for automatically withdrawing the elements from the material and returning them to their mutually adjacent position.

One embodiment of the invention is illustrated, by way of example, in the accompanying drawings in which—

Figure 1:
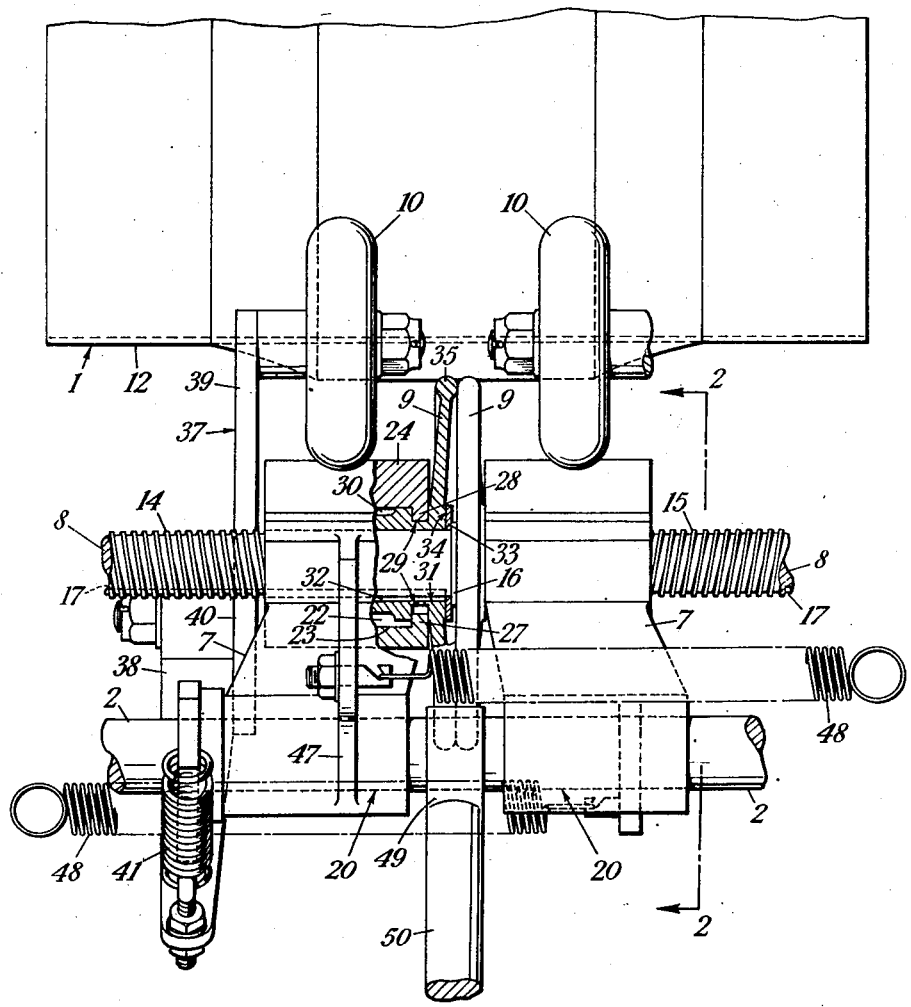
Fig. 1 is a side elevation of the apparatus in accordance with the invention shown partly in cross-section.

The apparatus shown in the accompanying drawings comprises essentially a tire building drum 1 rotatable about a horizontal axis, a guide rod 2 rotatably mounted at the end of a pair of supporting arms 3 located at each end of the rod 2, the said arms being rotatable on a pivot 4 supported by a bracket 5 attached to the machine frame 6. The axis of the guide rod is parallel to the axis of the tire building drum and a pair of carriages 7 are slidably supported on the guide rod and are adapted to be driven apart by a traversing shaft mounted parallel to the guide rod. Each carriage rotatably supports a freely rotatable consolidating disc 9 and a tread laying roller or wheel 10. The assembly, i. e. the carriages 7, guide rod 2, traversing shaft 8, rollers or wheels 10 and discs 9 can be moved towards the tire building drum by means of an air cylinder 11. After the carriages have been moved apart with the discs and rollers in contact with the tire building materials 12 located on the drum, the carriages are returned to a mutually adjacent position by means of a mechanism shown in Figs. 4 and 5.

The apparatus will now be more particularly described. Each end of the traversing shaft 8 is rotatably supported on the end of one arm of a bell crank lever 13, each lever being pivotally mounted on one of the supporting arms 3. A portion 14 of the traversing shaft 8 has a right-hand thread formed thereon and a further portion 15 of the shaft has a left-hand thread formed on its surface, the shaft having an integral collar 16 located between the left and right-hand thread portions. A key-way 17 is formed longitudinally on each portion of the shaft and extends across the screw-threaded portion. Each bell-crank lever has a close-coiled helical spring 18 attached to its end remote from the traversing shaft, the other end of the spring being attached to a lug 19 projecting from the supporting arm 3 adjacent to the guide rod 2.

Figure 3:
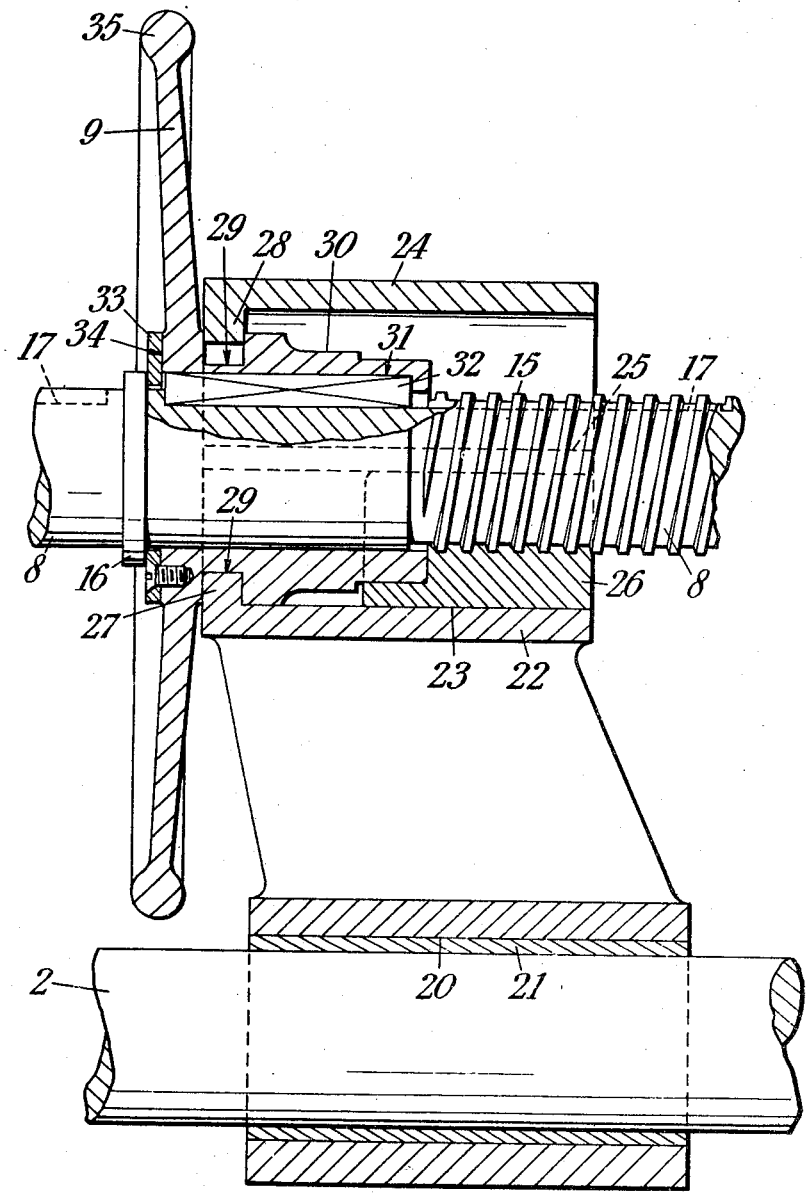
Fig. 3 is a cross-sectional side elevation of the feed carriage shown in Figs. 1 and 2.

Each carriage 7 is made up of a casting having a hole 20 disposed laterally across the carriage at one end thereof, the hole being provided with a brass bearing bushing 21 in which the guide rod is slidably mounted. At the end of the carriage remote from the guide rod, a traversing shaft housing 22 is provided. This comprises a semi-circular hole 23, Figs. 1 and 3, formed on the top of the carriage having its axis parallel to the axis of the guide rod and constituting part of the traversing shaft housing 22. A housing cap 24 is rigidly attached to the carriage to enclose the traversing shaft housing 22, packing plates 25 being provided between the cap 24 and the carriage so that an elongated hole is formed in which the traversing shaft is capable of lateral movement. A half nut 26, Fig. 3, formed by parting a whole nut along a line axially of the nut, is located in the semi-circular hole 23 forming part of the traversing shaft housing. The housing is provided with an inwardly flanged portion 27 formed at an end of the semi-circular hole and a similarly inwardly flanged portion 28 is formed at one end of the housing cap 24.

The consolidating dics 9 is mounted on the traversing shaft and is provided with a hub portion 30 which has formed on its outer periphery an annular groove 29 which locates with the inwardly flanged portions 27 and 28 of the housing 22. The consolidating disc 9 has a keyway 31 formed in the bore of the hub which rigidly locates a key 32 which is slidable in the keyway formed on the traversing shaft 8. An annular plate 33 is rigidly attached to an end face 34 of the consolidating disc hub 30, and serves to retain the key in its correct axial position. The consolidating disc 9 has a rounded peripheral portion 35 which is adapted to contact the tire building materials 12 located on the forming drum 1.

Figure 2:
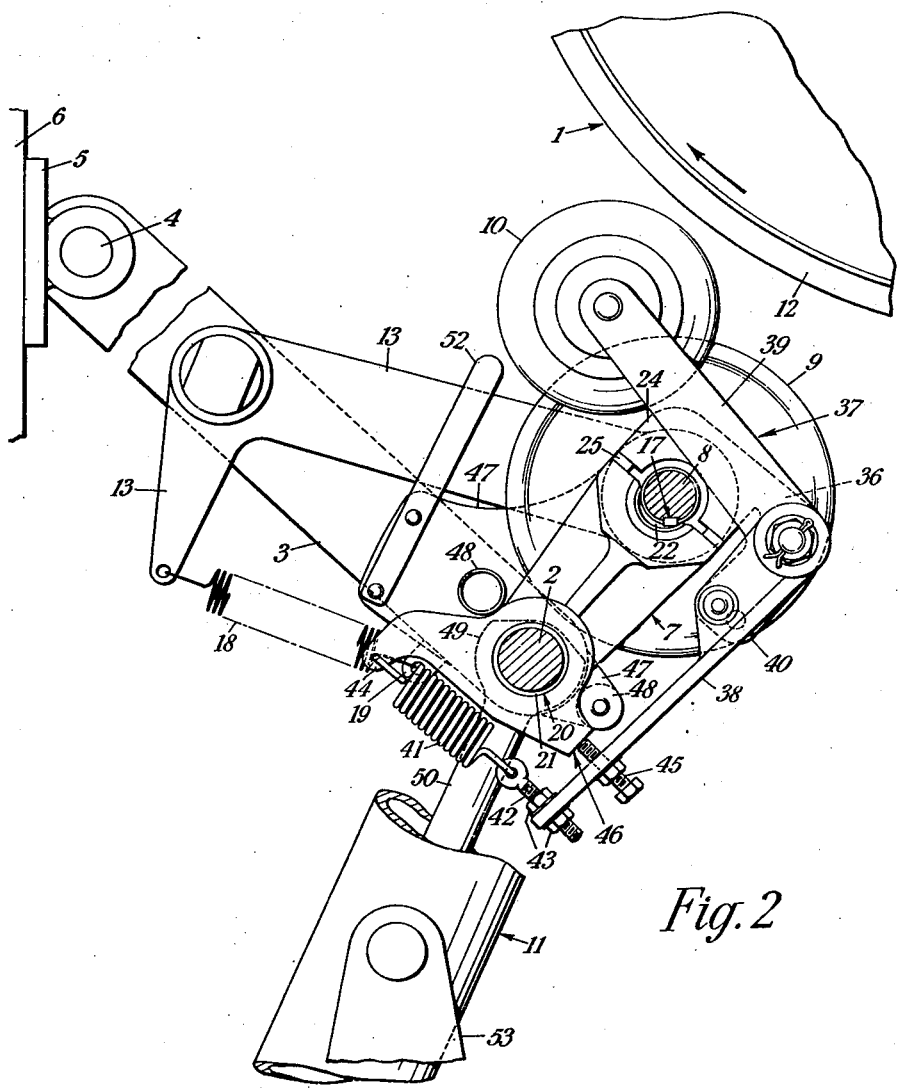
Fig. 2 is an end elevation of the apparatus shown in Fig. 1.

The housing cap 24 has an integral lug 36, Fig. 2, projecting therefrom which is drilled so as to pivotally support an L-shaped lever 37, one arm 39 of which projects laterally across the carriage 7 in a plane normal to the traversing shaft 8 and carries at its end the freely rotatable tread laying roller 10 which will be more fully described in a later part of the specification. The other arm 40 projects longitudinally of the carriage and has an extension lever 38 attached to its end, the lever 38 extending below the bottom of the carriage adjacent to the guide rod 2. A close-coiled helical spring 41 is rigidly attached to the end of the extension lever by means of an eyed bolt 42 fixed to the lever by means of nuts 43. The other end of the spring is attached to a spring flange 44 formed integrally with the feed carriage at its end remote from the L-shaped arm. Inward movement of the extension lever 38 towards the carriage is limited by a screw 45, attached to the lever 38 adjacent to its end, the end of the screw locating with a projecting portion 46 of the carriage formed integrally therewith on its side remote from the spring flange 44.

A return-spring flange 47 is formed integrally with each carriage and projects from a side of the carriage adjacent to the guide rod. A close-coiled helical return spring 48, Figs. 1 and 2, is attached to each flange 47, the other end of each spring being attached to one of the supporting arms 3. An actuating arm 52 is rigidly attached to one of the return-spring flanges 47.

The eyed end 49 of an air cylinder piston rod 50 is rotatably mounted on the guide rod between the carriages, the other end of the piston rod has a piston attached thereto which operates inside an air cylinder 11 which is pivotally mounted on a bracket 53 rigidly attached to a portion of the machine frame.

Figure 4:
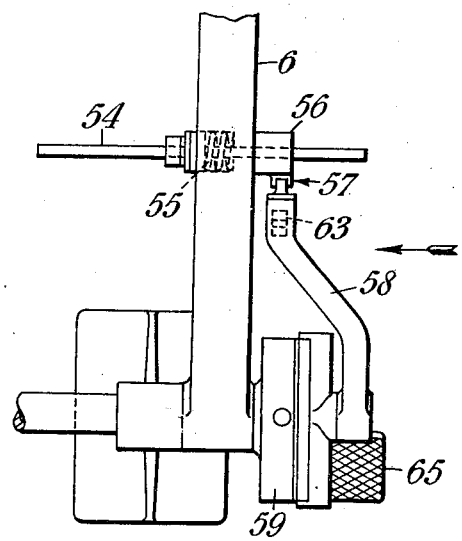
Fig. 4 is a plan view of a foot-operated air valve and release mechanism.
Figure 5:
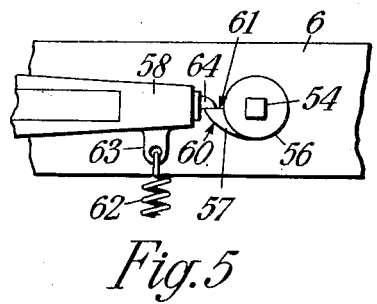
Fig. 5 is a side view of Fig. 4 looking in the direction of the arrow.

Figs. 4 and 5 illustrate a plunger 54 mounted on one side of the machine frame 6 and urged inwardly of the frame by means of a spring 55. The plunger 54 is of square cross-section (Fig. 5) and is thus non-rotatable. A collar 56 is rigidly attached to the plunger, the collar having a lug 57 formed integrally therewith, provided with a curved portion 60 and a radial portion 61.

A valve-operating arm 58 is pivotally attached between its ends to a valve 59 which is rigidly attached to the machine frame and adapted to control the air cylinder 11. The arm 58 is provided with a catch 64 spring loaded by means of a catch spring not shown so as to be movable longitudinally of the arm. A tension spring 62 is attached to a lug 63 formed integrally on the arm 58, the spring urging the arm downwardly so that when the arm is in the position illustrated in Fig. 5, the catch 64 is urged into firm contact with the radial face 61 of the lug 57. When the arm is in this position, the valve 59 is "open" to admit fluid to the cylinder 11. A treadle 65 is attached to the end of the arm 58 remote from the catch 64.

The operation of the apparatus will now be described. After the tire building materials 12 have been applied to the tire carcass the laying down operation can commence. The tire building drum is rotated at a speed of 150 R. P. M. and the operator applies pressure to the treadle 65. This rotates the arm 58 which opens the valve 59 so that air pressure is supplied to the cylinder 11. The catch 64 rides up the curved portion 60 of the lug 57. The catch 64 is moved axially inwardly of the arm against the pressure of the catch spring, not shown, until the catch moves clear of the curved portion 60. The catch spring then actuates the catch so that it is moved into its axially outward position, the catch being held against the radial portion 61 of the lugs by the pressure of the tension spring 62. Thus the arm is retained in position by the catch and lug so that the valve 59 remains "open" when the operator removes his foot from the treadle 65.

The air pressure supplied to the cylinder 11 moves the piston of the piston rod 50 outwardly of the cylinder, the piston rod 50 moving the guide rod 2 and thus the carriage 7 towards the tire building drum 1. The tread rollers 10 contact the tire building materials 12 located on the building drum. Further movement of the piston rod causes the L-shaped lever 37, on which the tread laying rollers 10 are mounted, to rotate on its pivot, this movement being resisted by the spring 41 attached to the end of the extension lever 38. The resistance of the spring 41 provides pressure to tread laying rollers 10 which are held by the spring in resilient contact with the materials on the drum. Simultaneously the consolidating discs 9 are moved toward the drum, and contact the materials on the drum after the movement of the lever 37. After the discs have contacted the materials, the movement of the piston rod 50 carries the half nut 26, mounted in the housing 22, into engagement with the traversing shaft 8. Movement of the traversing shaft relative to the half nut is resisted by the tension of the spring 18 attached to the bell-crank lever 13 which supports the shaft 8.

The tread laying wheels and the consolidating discs are rotated by contact with the tire building materials on the rotating drum, the rotation of the consolidating discs being transmitted through the consolidating disc keys 32 to the traversing shaft. When the rotating traversing shaft meshes with the half nut 26 the carriages 7 are driven mutually apart carrying with them the discs and wheels which move across the surface of the tire building materials to simultaneously perform the tread spinning and laying down operations.

When the consolidating discs and tread laying wheels have moved across the surface of the tire building materials, the actuating arm 52 engages with the plunger 54 which is moved thereby outwardly of the machine frame against the tension of the spring 55. The lug 57 attached to the collar mounted on the plunger is moved by the plunger out of engagement with the catch 64. The arm 58 is then rotated by the tension spring 62 to close valve 59 which cuts off the air pressure to the cylinder 11 and exhausts the cylinder air.

The carriages then move away from the tire building drum and the spring attached to the end of the bell crank lever 13 rotates the lever so that the traversing shaft moves out of mesh with the half nut 26. The return springs 48 which are extended when the carriages are moved mutually apart, operate when the half nut is disengaged from the shaft in order to draw the carriages into their mutually adjacent positions. Movement of the carriages away from the tire building drum also allows the springs 41 attached one to each extension lever 38 to rotate the L-shaped lever 37 into a position wherein each screw 45 locates with the corresponding projecting portion 46 attached to a carriage.

Thus the assembly is in a position suitable for performing further consolidating and laying down operations.

Figure 6:
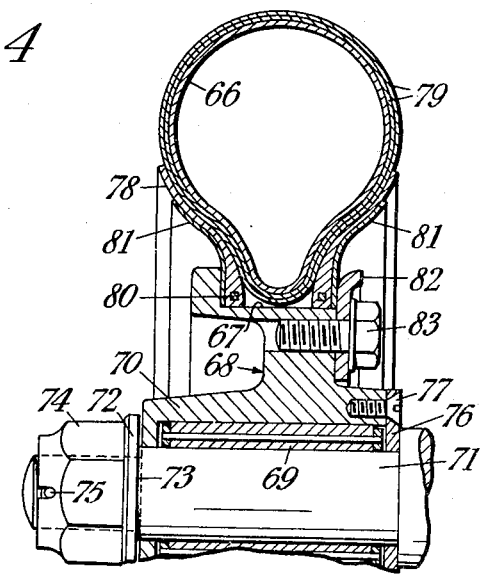
Fig. 6 is a cross-sectional end elevation of part of a tread roller.

Each tread laying wheel 10 comprises a pneumatic tube 66, Fig. 6, mounted on a rim 67 on the periphery of a radial web 68 of the wheel 10 rotatably mounted on a needle bearing 69 located in the wheel hub 70 and rotatable on an axle 71 rigidly attached to the arm 39. The hub 70 is prevented from moving axially off the axle 71 by means of a washer 72 held in position against a shoulder 73 formed on the axle by means of a nut 74. The nut is locked on the axle by means of a pin 75. An annular cover plate 76 for the bearing 69 is held in position on an end face of the hub by means of the countersunk screws 77.

A pair of rubber tire sidewalls 78 are located on the rim 67 one on each side of the pneumatic tube 66 which is provided with a double covering of canvas 79 which entirely covers its outer surface. The sidewalls each have a bead 80 and a thin annular metal plate 81 fits snugly against the outer face of each sidewall. The tube, sidewall and plates are held in position on the rim by means of a removable annular rim flange 82 held in position by the bolts 83 which screw into tapped holes provided in the radial face of the wheel 10.

The canvas covering 79 provides support for the tube and the covering limits the inflated size of the tube to the inside dimension of the canvas covering; in addition it protects the tube from wear and is easily replaceable when worn out.

The tire sidewalls 78 and the metal plates 81 prevent the tube 66 from rolling axially off the wheel rim 67 when side thrust is imposed on the tube during the tread laying operation.

The wheels 10 should preferably be of light construction so that in combination with the pneumatic tube and sidewalls the assembly has a low value of rotational inertia. This is a considerable advantage in that laying down means having a low value of rotational inertia are capable of rapidly assuming a peripheral speed which is substantially the same as that of the plies or tread upon which they run.

In an alternative embodiment of the present invention the pneumatic tube is replaced by an annular member made of sponge rubber and having a similar shape to the inflated pneumatic tube; the annular member is attached to the rim of a laying wheel by a suitable adhesive or other means.

In a further construction in accordance with the invention the carriages are driven mutually apart by power driving means. In this instance the consolidating discs are freely rotatable on the traversing shaft, which, instead of being rotated by the consolidating discs is rotated by power driving means. In other respects this construction is exactly similar to the one previously described.

Having described my invention what I claim is:

1. Tire building apparatus which comprises a rotatable forming drum, a pair of freely rotatable wheels each having an annular pneumatic tube mounted on its rim, a pair of freely rotatable nonresilient spinning discs located between said wheels, means for pressing said annular pneumatic tubes of said wheels and said discs into rolling contact with material on the surface of said drum, and means to move said wheels and discs in opposite directions from the mid portion of said drum to the opposite ends thereof while said annular tubes and said disc are in rolling contact with material on the surface of said drum.

2. Apparatus according to claim 1 wherein the axial movement of the wheels and discs is effected by the rotation of the discs.

3. Apparatus according to claim 2 which comprises a pair of carriages movable in opposite directions axially from a mutually adjacent position each having a wheel and a disc attached thereto, means for moving the carriages whereby the wheels and discs move into contact with said materials on said drum and said carriages move axially from said mutually adjacent position and automatic means operated when the axial movement of the carriages has reached a predetermined amount for withdrawing the wheels and discs from contact with said materials on said drum and returning them to their mutually adjacent position.

4. Apparatus according to claim 3 wherein the means for moving the wheels and discs axially apart comprises a traversing shaft a portion of said shaft having a right-hand thread formed thereon and a further portion having a left-hand thread formed thereon, at least one of said discs being slidably keyed to one of said portions whereby the discs are slidable axially on and drive the said shaft, and a screw threaded member associated with each of the carriages, each of said members being adapted to engage a screw threaded portion of the shaft when the wheels and discs are moved into contact with the said materials and to disengage the said portion when the wheels and discs are moved out of contact with the said materials.

5. Apparatus for laying down tire building elements on a tire carcass on a rotatable drum which comprises a pair of carriages movable from a mutually adjacent position in opposite directions parallel to the axis of a tire carcass and movable toward and from the tire carcass, each carriage having a rotatable wheel, carrying on its rim an annular pneumatic tube, and a rotatable non-resilient disc spaced axially from its respective wheel toward the central plane of the tire carcass to contact and be rotated by the tire carcass and a driving element to move said carriages away from each other during contact of the annular pneumatic tubes of said wheels and of said discs with said tire carcass.

6. The apparatus of claim 5 in which said driving means comprises an axially fixed rotatable screw oppositely threaded on opposite sides of the mid plane of the tire carcass and slidably keyed to one of said discs and a half nut on each carriage movable into engagement with said screw by relative displacement of said screw on pressure contact of said discs with said carcass.

7. The apparatus of claim 5 having means to withdraw said carriages from said tire carcass when separated to a set distance.

8. Apparatus for laying down tire building elements on a tire carcass on a rotatable drum which comprises a pair of carriages movable from a mutually adjacent position in opposite directions parallel to the axis of a tire carcass and movable toward and from the tire carcass, each carriage having a rotatable wheel, carrying an annular pneumatic tube on its rim, and a rotatable non-resilient disc spaced axially from its respective wheel toward the central plane of the tire carcass to contact and be rotated by the tire carcass, and fluid actuated means to move said carriages toward and from the tire carcass.

RONALD JESSE BARBER.

REFERENCES CITED

The following references are of record in the file of this patent:

UNITED STATES PATENTS

| Number | Name | Date |
| --- | --- | --- |
| 2,161,117 | Wikle | June 6, 1939 |
| 2,381,379 | Stevens | Aug. 7, 1945 |
| 2,464,020 | Breth | Mar. 8, 1949 |
| 2,541,648 | Haase | Feb. 13, 1951 |